(12) United States Patent
Mayer

US006309539B1

(10) Patent No.: US 6,309,539 B1
(45) Date of Patent: Oct. 30, 2001

(54) FILTRATION AND SUBSURFACE DISTRIBUTION SYSTEM

(75) Inventor: Robert B. Mayer, Manassas, VA (US)

(73) Assignee: American Manufacturing Company, Inc., Manassas, VA (US)

( * ) Notice: Subject to any disclaimer, the term of this patent is extended or adjusted under 35 U.S.C. 154(b) by 0 days.

(21) Appl. No.: 09/498,991

(22) Filed: Feb. 7, 2000

(51) Int. Cl.[7] ............................... F04B 49/04; C02F 9/02
(52) U.S. Cl. ................... 210/86; 417/40; 417/2; 210/104; 210/109; 210/123; 210/170; 210/138; 210/532.2
(58) Field of Search .................. 210/86, 97, 104, 210/109, 121, 123, 167, 170, 257.1, 258, 532.1, 532.2, 138; 417/40, 36, 2; 137/565.29

(56) References Cited

U.S. PATENT DOCUMENTS

| | | |
|---|---|---|
| 2,142,196 * | 1/1939 | Langdon . |
| 2,578,981 | 12/1951 | Parker . |
| 3,425,936 | 2/1969 | Culp et al. . |
| 3,724,664 | 4/1973 | Lemberger et al. . |
| 3,844,946 | 10/1974 | Farrell, Jr. . |
| 3,920,550 | 11/1975 | Farrell, Jr. et al. . |
| 3,933,641 | 1/1976 | Hadden et al. . |
| 4,251,359 | 2/1981 | Colwell et al. . |
| 4,623,451 | 11/1986 | Oliver . |
| 4,812,237 | 3/1989 | Cawley et al. . |
| 4,818,384 | 4/1989 | Mayer . |
| 4,818,420 | 4/1989 | Mims . |
| 4,822,485 | 4/1989 | Mayer . |
| 4,966,705 | 10/1990 | Jamieson et al. . |
| 4,986,905 | 1/1991 | White . |
| 5,017,040 | 5/1991 | Mott . |
| 5,091,095 | 2/1992 | Fries et al. . |
| 5,128,040 | 7/1992 | Molof et al. . |
| 5,200,065 | 4/1993 | Sinclair et al. . |
| 5,360,556 * | 11/1994 | Ball et al. . |
| 5,534,147 | 7/1996 | Kallenbach et al. . |
| 5,597,477 | 1/1997 | Harry, III . |
| 5,766,475 | 6/1998 | Mayer et al. . |
| 6,132,599 * | 10/2000 | Chaffee . |

FOREIGN PATENT DOCUMENTS

619431 A1 * 10/1994 (EP) .

* cited by examiner

Primary Examiner—Joseph W. Drodge
Assistant Examiner—Terry K. Cecil
(74) Attorney, Agent, or Firm—McGuireWoods LLP

(57) ABSTRACT

A filtration and subsurface distribution system having a vaulted splitting device (e.g., dosing vault) in a recirculating pump tank. The recirculating pump tank houses a sand filter pump and the dosing vault houses a dosing pump. The dosing vault and the dosing pump may be housed outside and remote from the recirculating pump tank which ensures that effluent will not be mixed within the dosing vault. The sand filter pump doses a sand filter with the septic effluent via a feed line. The effluent is then filtered by the sand filter and returned to the dosing vault via a filtrate return. When the filtrate reaches a certain predetermined level within the dosing vault, the drip pump is enabled and turned "on". In this manner, the filtrate is dosed or dripped into a drain absorption field without mixing with the septic effluent.

17 Claims, 4 Drawing Sheets

FILTRATION AND SUBSURFACE DISTRIBUTION SYSTEM

BACKGROUND OF THE INVENTION

1. Field of the Invention

The present invention relates generally to a filtration and subsurface distribution system and, more particularly, to a filtration and subsurface distribution system having a splitting device for containing and discharging filtered effluent (e.g., filtrate) into an on-site drain or dosing absorption field without mixing with unfiltered effluent.

2. Background Description

In the absence of conventional public wastewater disposal and treatment systems, it is not uncommon for residential and small businesses to use on-site waste water management systems. Typically, these wastewater management systems include a septic tank, and under certain conditions may additionally include a recirculating pump tank and filter.

In one such conventional system, wastewater flows into and out of the septic tank via baffled pipes which slow the flow of water and prevent sewage from flowing directly through the septic tank. In the septic tank, solids are settled into the bottom while lighter particles including grease and foam float to the surface and form a layer of scum. The solid material in the septic tank is then broken down via a bacterial action.

In systems without a recirculating pump tank or a filter, the wastewater then flows from the septic tank into a distribution box so that the wastewater can be spread evenly into porous pipes arrayed in an absorption field (e.g., on-site drain or dosing field). The quality of the resulting absorption treatment and filtration of the effluent will depend on the characteristics of the soil and the site. These characteristics may include soil permeability, drainage, slope, and depth to limiting conditions such as groundwater or bedrock. Thus, poor soil conditions will negatively impact on the resulting quality and absorption of the septic effluent.

In cases where the absorption of the effluent in the on-site absorption drain or dosing field is not sufficient to adequately treat the septic effluent, recirculating pump tanks (also referred to as mix chambers) as well as filters may be utilized to further treat the effluents. In these wastewater management systems, the septic effluent is discharged into the recirculating pump tank which includes a single chamber and a recirculating pump. In use, the recirculating pump periodically pumps the septic effluent in appropriate doses from the recirculating pump tank to the filter for filtering of the effluent. During the filtering process, the effluent is filtered so that solid particles will be removed from the effluent and may be further treated by way of an aerobic process which removes further contaminants therefrom. After the effluent is distributed over the filter, the filtrate (e.g., filtered effluent) is collected and directed back through a ratio box to the recirculating pump tank and the drain field.

It is noted, however, that the filtrate returning to the recirculating pump tank is then mixed with unfiltered septic effluent in the recirculating pump tank. This, of course, contaminates the filtrate such that the contaminated filtrate must again be refiltered via the filter. It is further noted that by using this type of system the filter is not dosed with effluent during low flow periods. This allows for long filter rest periods which then detracts from the quality of effluent being discharged from the system. This is mainly due to lack of biological activity within the filter during resting periods and immediately after restart.

Although ratio boxes are widely used in the field of wastewater management systems, another method of treating the effluent is to first discharge the septic effluent from the recirculating pump tank into the filter and thereafter permit the filtrate to flow directly back into the recirculating pump tank. However, in these wastewater management systems the final discharge of the effluent is determined by the elevation of the pumping station such that the filtrate may be mixed with the septic effluent, at times. As an improvement over wastewater management systems that use ratio boxes, these systems periodically dose the filter on a continuous basis thereby providing enhanced effluent quality with low maintenance costs. Again, the enhanced effluent quality is mainly due to the fact that the filter is not rested for long periods thus ensuring enhanced biological activity of the filter.

What is thus needed is a wastewater management system that does not mix septic effluent with the filtered filtrate prior to discharging the filtrate. This system would thus ensure that only filtrate is discharged into the absorption drain field and that only septic effluent is being filtered by the filter. Such a wastewater management system would also be capable of controlling the effluent flow into the filter (e.g., dose the filter) and filtrate into the absorption drain field such that the filter and the absorption drain field are utilized in an efficient manner thereby providing enhanced effluent quality with low maintenance costs.

SUMMARY OF THE INVENTION

It is therefore an object of the present invention to provide a filtration and subsurface distribution system having a vaulted splitting device (e.g., dosing vault) associated with a recirculating pump tank.

It is a further object of the present invention to provide a filtration and subsurface distribution system that is controlled by an integrated control unit.

It is also a further object of the present invention to provide a filtration and subsurface distribution system that prevents mixing of septic effluent with filtrate.

It is still another object of the present invention to provide a filtration and subsurface distribution system having a separate filtrate pump for pumping only filtrate into an absorption drain field.

It is also another object of the present invention to provide a filtration and subsurface distribution system having an alarm system to alert a user when the effluent in the recirculating pump tank exceeds a certain level.

It is still also another object of the present invention to provide a filtration and subsurface distribution system having an alarm system to alert a user to a failure of a sand filter pump or a dosing pump.

It is also still another object of the present invention to provide a control unit having a dose timer for efficiently treating and disposing septic effluent on a time dose basis.

According to the invention, there is provided a septic tank for receiving effluent from a household or other building. The overflow of the septic tank flows into a recirculating pump tank which includes a dosing vault separated from the effluent flowing into the recirculating pump tank. The recirculating pump tank houses a sand filter pump and the dosing vault houses a dosing pump. The dosing vault and the dosing pump may be housed outside and remote from the recirculating pump tank which ensures that effluent will not be mixed within the dosing vault.

The sand filter pump doses a sand filter with the septic effluent via a feed line. The effluent is then filtered by the sand filter and returned to the dosing vault via a filtrate return. When the filtrate reaches the dosing vault it is isolated from the effluent in the recirculating pump tank. The filtrate overflows the dosing vault into the septic tank. When the filtrate reaches a certain predetermined level within the dosing vault and the recirculating tank, the dosing pump is enabled and turned "on". In this manner, the filtrate is dosed or dripped into a drain absorption field without mixing with the septic effluent.

The filtration and subsurface distribution system also includes several floats for controlling (preferably in combination with a control unit) the sand filter pump and the dosing pump. A first float in the recirculating pump tank allows the control unit to run the sand filter pump when the effluent raises the first float above a normal position and "disables" the sand filter pump when the effluent falls below the level of the first float. A second float in the recirculating pump tank and positioned above the first float increases the rate at which the sand filter is dosed to a standard flow rate. A third float in the recirculating pump tank manages the peak flows and excess effluent within the recirculating pump tank. In use, when there is a peak flow or excess effluent, both the sand filter pump and the drip pump will increase its dosing frequency to a high volume pumping cycle. A fourth float in the recirculating pump tank is an alarm. The alarm is activated when the effluent level raises the fourth float. The activation of the fourth float may be due to (i) the effluent flow rate being higher than the sand filter pump capacity, (ii) the failure of the sand filter pump or (iii) the failure of the dose pump.

The dosing vault also includes two floats. These floats are controlled by the level of the filtrate within the dosing vault, and are used with the control unit and in combination with the floats in the recirculating pump tank to control the dosing pump. There is a predetermined distance between the first float and the second float in the dosing vault to ensure that at least one full dosing cycle can be completed before the filtrate drops below the level of the first float. Also, the second float in the dosing vault is located at a higher level than the alarm float of the recirculating pump tank.

The present invention further includes a control unit which may control dosing cycle intervals of either the sand filter pump or the dose pump. The control allows reprogramming of the time and volume of the dose to different individual zones or absorption areas. The control may be activated by a combination of the floats, and ensures that neither of the pumps will run when there is insufficient effluent in the recirculating pump tank or filtrate in the dosing vault.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The filtration and subsurface distribution system of the present invention is a pretreatment and fluid dispersal system providing recirculating sand filter aggregate treatment of septic tank effluent with a vaulted splitting device (e.g., dosing vault) in a recirculating pump tank. In the embodiments of the present invention, the pretreatment is followed by slow rate equal distribution over an absorption area by way of subsurface drip irrigation tubing. It is further contemplated that the system of the present invention may equally be used with other types of dispersal systems, such as, for example, conventional gravel trenches and the like. By using the filtration and subsurface distribution system of the present invention, a filtered effluent (e.g., filtrate) may be discharged into the enviroment (e.g., the absorption drain field) without mixing the filtrate with effluent from the septic tank. This ensures proper and efficient use of the absorption drain field by, for example, not saturating the absorption drain field with septic effluent.

In order to achieve the objectives of the present invention, a two pump system controlled in tandem by a control unit is contemplated for use with the recirculating pump tank of the present invention. In the preferred embodiment, the recirculating pump tank includes a separate dosing vault which isolates the septic effluent from the filtrate. The recirculating pump tank includes a pump (e.g., sand filter pump) and the dosing vault includes another pump (e.g., dosing pump) isolated from the sand filter pump. In use, the sand filter pump can be used to pump the septic tank effluent to the sand filter while the dosing pump can be used to dose the filtrate to the absorption drain field.

Figure 1:
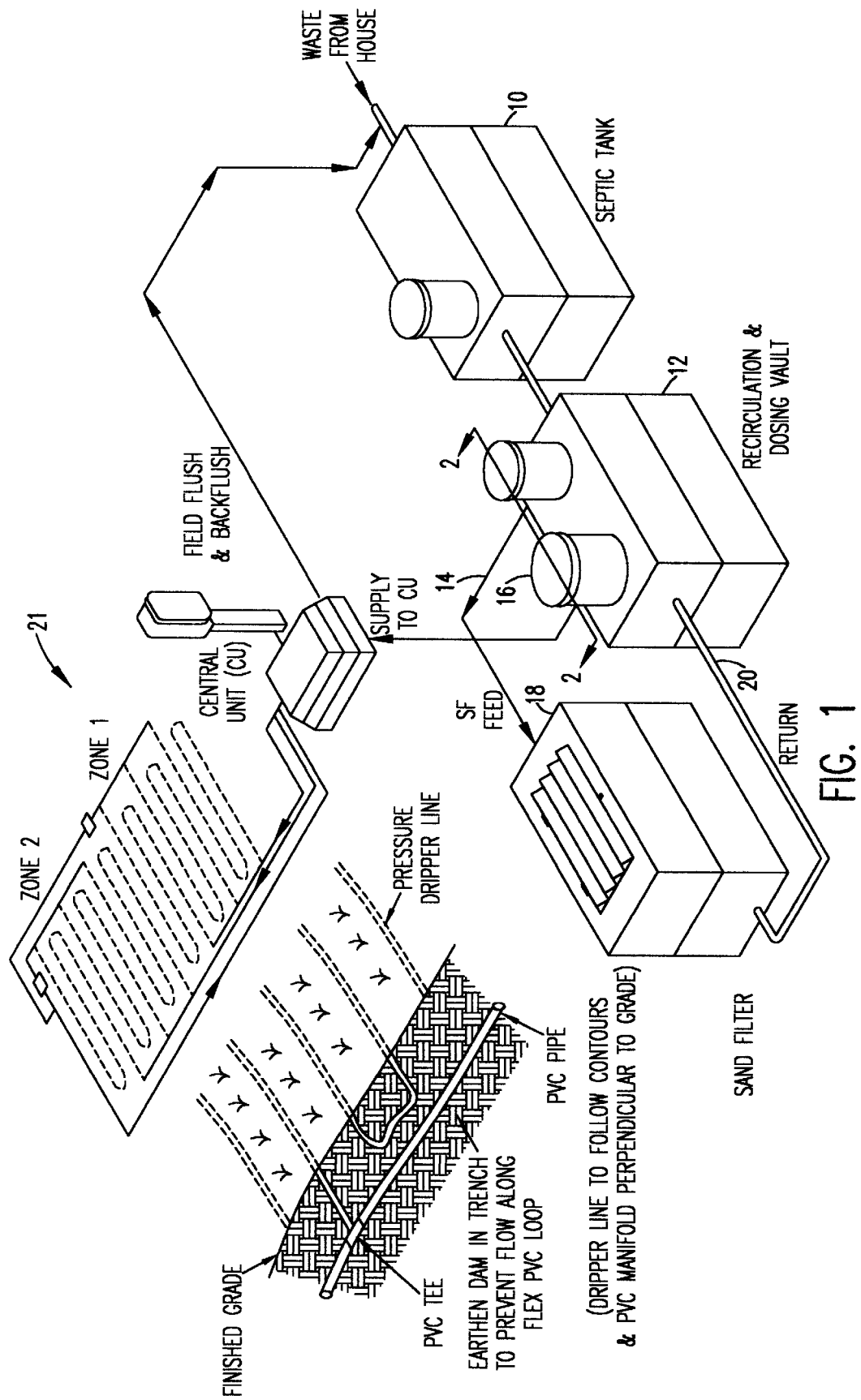
FIG. 1 shows a general overview of a wastewater management system of the present invention.

Referring now to FIG. 1, a general overview of a wastewater management system of the present invention is shown. Specifically, wastewater (e.g., effluent) from a household or other building is discharged into a septic tank 10. It is noted that the septic Tank 10 of the present invention is a perfecting feature of the present invention, and that any known septic tank may be used with the present invention. The overflow of the septic tank then flows into a recirculating pump tank 12 which preferably houses a sand filter pump (see FIG. 2) and a dosing vault 16. A dosing pump (see FIGS. 2 and 3) is housed in the dosing vault 16 within the recirculating pump tank 12 such that the dosing pump and filtrate are isolated and separated from both the sand filter pump and the septic effluent. In the embodiments of the present invention, the dosing vault 16 may hold approximately 60 gallons of filtrate and the recirculating tank may hold approximately 1000 gallons of effluent; however, it is noted that one of ordinary skill in the art will readily recognize that other capacity tanks may also be used with the present invention. In still further embodiments, the dosing vault 16 and the dosing pump may be located outside and remote from the recirculating pump tank 12 so that the filtrate returning to the dosing vault 16 for dosing the absorption drain field will flow into the dosing vault 16 outside of the confines of the recirculating pump tank 12.

Still referring to FIG. 1, the sand filter pump doses the sand filter 18 with septic effluent via a feed line 14. Similar to the septic tank 10, the sand filter 18 is a perfecting feature of the present invention such that the present invention is not limited to any one filter but instead may use any known filter. The effluent is then filtered by the sand filter 18 and returned to the dosing vault 16 via a filtrate return 20. When the filtrate reaches a certain predetermined level within the dosing vault 16, the dosing pump is enabled and turned "on". In this manner, the filtrate is dosed or dripped into a drain absorption field 21 without mixing with the septic effluent. In the preferred embodiments, the system of the present invention provides for treatment and disposal on a time dose basis as opposed to typical conventional demand dosing (discussed below in greater detail).

Figure 2:
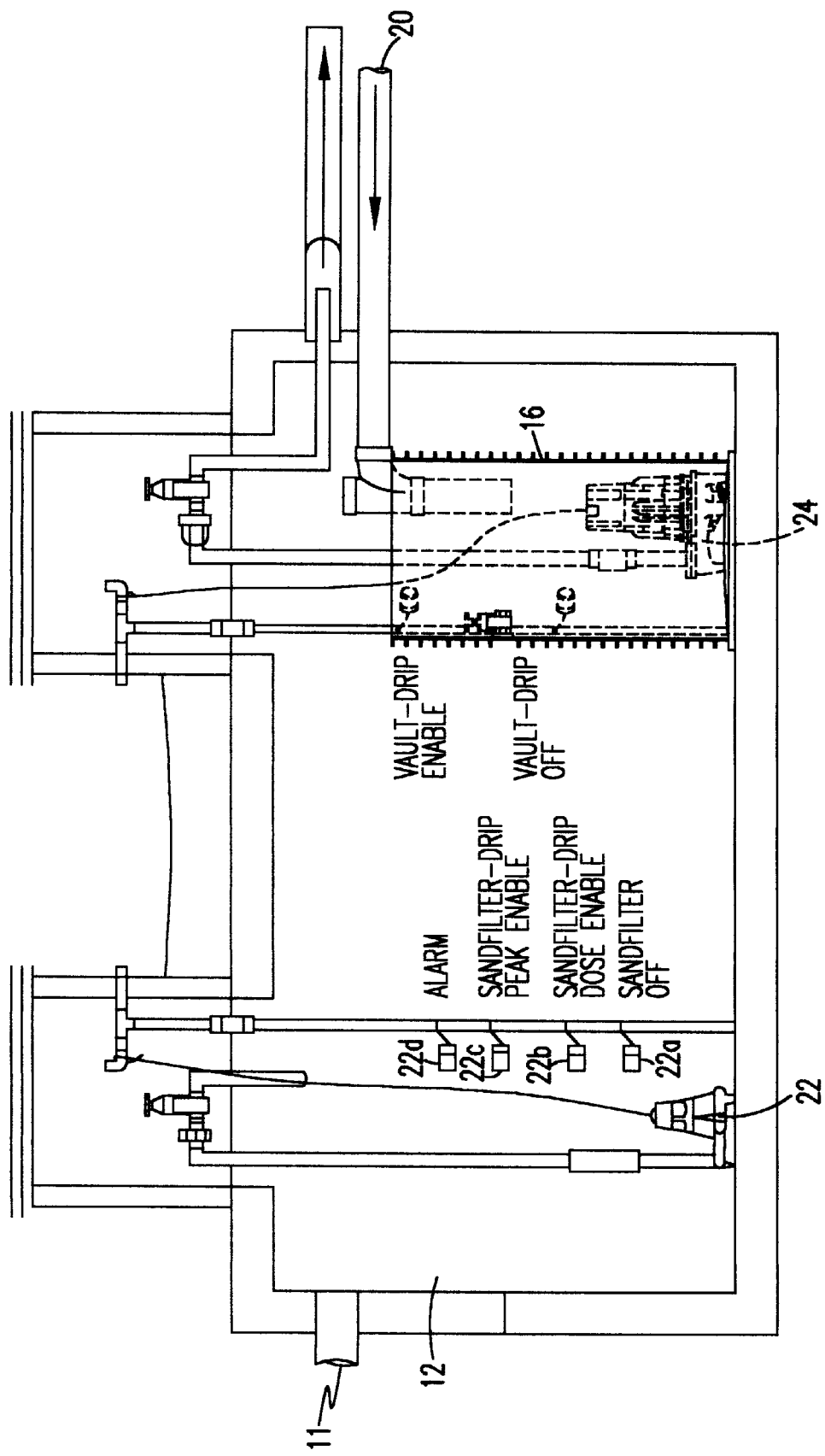
FIG. 2 shows a cross sectional view of the recirculating pump tank along line 2—2 of FIG. 1.

FIG. 2 shows a cross sectional view of the recirculating pump tank 12 along line 1—1 of FIG. 1. As clearly seen in FIG. 2, the dosing vault 16 is provided within the recirculating pump tank 12 and isolates the dosing pump 24 and filtrate from the sand filter pump 22 and the septic effluent in the recirculating pump tank 12. This allows the filtrate to be dosed to the drain field 21 without mixing with the septic effluent within the recirculating pump tank 12. As a further precaution to ensure that the filtrate does not mix with the septic effluent, the dosing vault 16 and dosing pump 24 may be located outside and remote from the recirculating pump tank 12.

As further seen in FIG. 2, four floats are provided within the recirculating pump tank 12. These floats are controlled by the level of the effluent in the recirculating pump tank 12 and are used in combination with a control unit to control in tandem both the sand filter pump 22 and the dosing pump 24. In the embodiments of the present invention, the control unit may include a timer in order to provide for treatment and disposal on a time dose basis when effluent is available, as opposed to typical conventional demand dosing. By using the floats of the present invention, the sand filter dosing cycle may be minimized until enough effluent has accumulated for disposal, allowing the sand filter and absorption area to rest. The resting time determined by the control unit timer is set to maximize the treatment of the effluent remaining in the recirculating pump tank 12 while not detracting from the quality of effluent being discharged from the sand filter 18.

Referring still to FIG. 2, a first float (e.g., Sand Filter Off Float) 22a is positioned at a first height above the sand filter pump 22. The Sand Filter Off Float 22a allows the control unit to control the sand filter pump 22 when the effluent is at or above the normal resting level of the Sand Filter Off Float 22a (e.g., resting float position) and "disables" the sand filter pump 22 if the effluent falls below the level of the Sand Filter Off Float 22a. In the preferred embodiments, the sand filter pump 22 is controlled by a control unit timer which will allow the sand filter pump 22 to remain enabled until the timer has timed out. The Sand Filter Off Float 22a and/or the control unit ensure that the sand filter pump 22 does not run through a pump cycle without any effluent within the recirculating pump tank 12.

Also seen in FIG. 2 is a second float (e.g., Standard Dispersal Dose Enable Float) 22b positioned above the Sand Filter Off Float 22a at a predetermined distance. The Standard Dispersal Dose Enable Float 22b increases the rate at which the sand filter is dosed by increasing the frequency of dosing by the sand filter pump 22, and preferably allows the sand filter pump 22 to run at a standard flow rate (e.g., dosing cycle) when the effluent raises the Standard Dispersal Dose Enable Float 22b above the normal position. In the embodiments of the present invention, the Standard Dispersal Dose Enable Float 22b will allow the sand filter pump 22 to dose and treat the effluent at an average rate of approximately 50% to 60% of the peak design rate of the system of the present invention. The peak design rate will, of course, vary depending on the absorption rates of the soil as well as local rules and ordinances which cover septic and other dispersal systems. By way of example, however, the peak flow rate may be 450 gallons per day for a three bedroom house.

The frequency of the dosing by the sand filter pump 22 is decreased when the effluent level drops below the Standard Dispersal Dose Enable Float 22b (and the timer has timed out). The control unit ensures that the sand filter pump 22 remains "on" for a single cycle, e.g., the level of the effluent being lowered to at least the level of the Sand Filter Off Float 22a, and further ensures that the sand filter pump 22 will not run without any effluent being pump therefrom.

A third float (e.g., Peak Enable Dose Enable Float) 22c is also shown in FIG. 2. The Peak Enable Dose Enable Float 22c is positioned above the Standard Dispersal Dose Enable Float 22b at a predetermined distance and manages the peak flows and excess effluent within the recirculating pump tank 12. In use, when there is a peak flow or excess effluent, both the sand filter pump 22 and the dosing pump 24 will increase flow capacity to a high volume pumping cycle when the effluent reaches above the Peak Enable Dose Enable Float 22c (this is typically 100% of treatment and dispersal capacity). The use of a high pumping cycle ensures that the effluent flowing into the sand filter 18 from the recirculating pump tank 12 and the filtrate flowing into the absorption drain field 16 from the dosing vault 16 will be adequately treated and discharged. Similar to the previously described floats, the Peak Enable Dose Enable Float 22c will be raised above the normal position when the effluent rises to a certain level above the Peak Enable Dose Enable Float 22c and will be lowered to the normal position when the peak flow or excess effluent subsides.

A fourth float (e.g., High Level-Alarm Float) 22d is also provided in the recirculating pump tank 12. The High Level-Alarm Float 22d is positioned above the Peak Enable Dose Enable Float 22c at a predetermined level and is activated when the effluent level raises the High Level-Alarm Float 22d. The activation of the High Level-Alarm Float 22d may be due to (i) the effluent flow rate being higher than the sand filter pump 22 capacity, (ii) the failure of the sand filter pump 22 or (iii) the failure of the dosing pump 24. In the embodiments of the present invention, the High Level-Alarm Float 22d may activate an audio/visual alarm which may disable both the sand filter pump 22 and the dosing pump 24. The audio portion of the alarm may be silenced by, for example, pressing a "Test-Normal-Silence" switch located on a control panel. In the preferred embodiments, the alarm circuit will latch until manually reset after the High Level-Alarm Float 22d returns to its normal position.

It is noted that the designations or names used to describe the above floats are used for clarity purposes only and that the present invention is not limited to the designations or names of all of the floats, and that other designations or names may equally be used by the present invention to describe the floats 22a, 22b, 22c and 22d. Also, the present invention is not limited to the combination of floats 22a, 22b, 22c and 22d as described with reference to FIG. 2. In fact, the combination of floats 22a, 22b, 22c and 22d described with reference to FIG. 2 are provided herein as an illustrative example used with a particular embodiment of the present invention. It is thus readily appreciated that other combinations of floats may be used with the present invention, such as, for example, the Sand Filter Off Float 22a can be used in combination with the Standard Dispersal Dose Enable Float 22b in order to control the flow rate of the sand filter pump 22.

Figure 3:
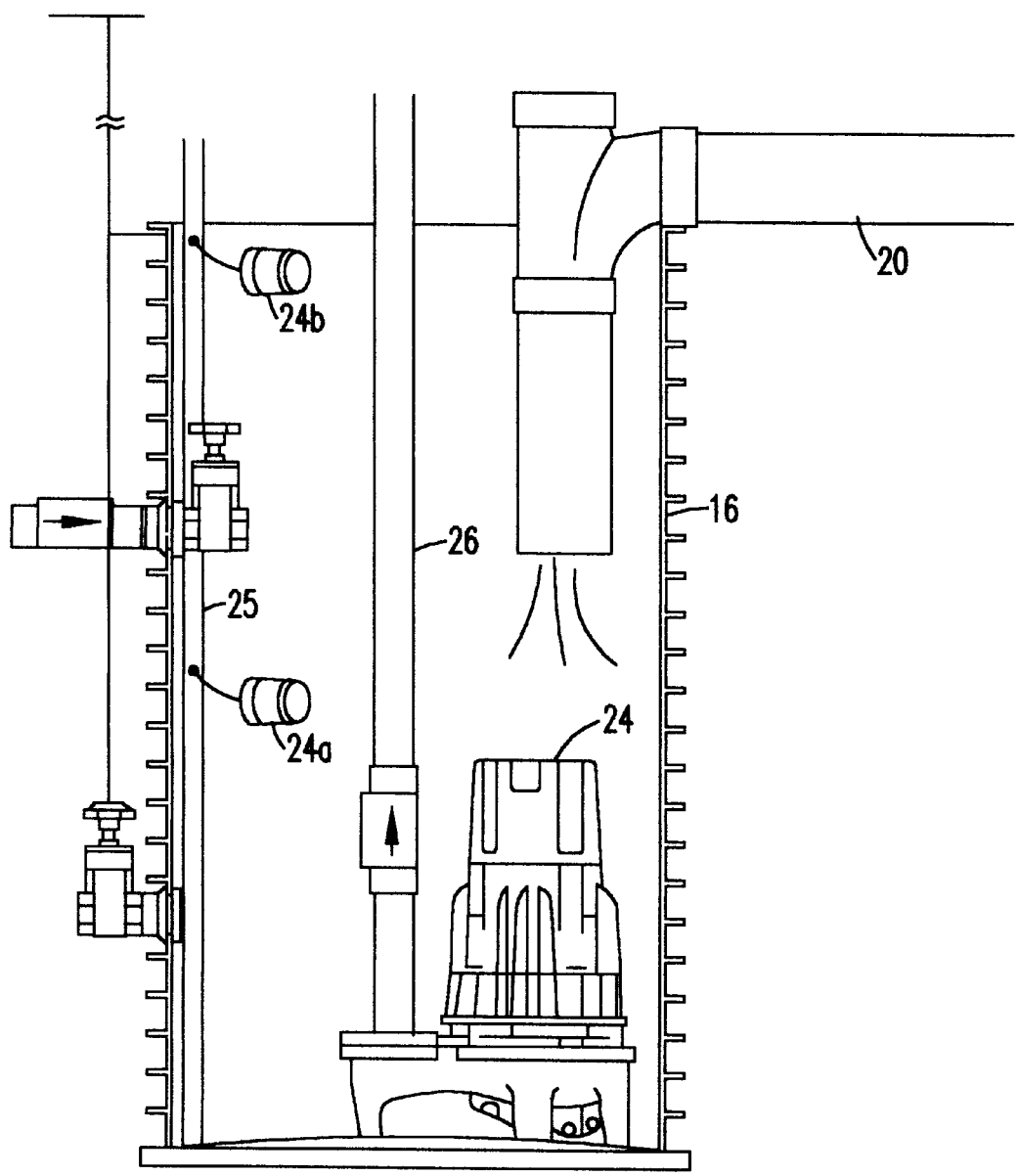
FIG. 3 shows a detailed view of the dosing vault.

Referring now to FIG. 3, a detailed view of the dosing vault and dosing pump is shown. The dosing vault 16 includes two floats, a Vault Drip Off Float 24a and a Drip Dose Enable Float 24b (both mounted to a float bar 26). These floats 24a and 24b are controlled by the level of the filtrate within the dosing vault 16, and are used with the control unit to control the dosing pump 24. The floats 24a and 24b are further used in tandem with the floats 22a 22b, 22c and 22d.

Being more specific, the Vault Drip Off Float 24a is located at a first height within the dosing vault 16 and "enables" the timer to run the dosing pump 24 when the filtrate level raises the Vault Drip Enable Off Float 24a above its "off" position. The Drip Dose Enable Float 24b is located at a predetermined distance above the Vault Drip Enable Off Float 24a and enables the control unit to turn "on" the dosing pump 24 when the filtrate level raises the Drip Dose Enable Float 24b above its "off" position. The predetermined distance between the Vault Drip Enable Off Float 24a and the Drip Dose Enable Float 24b ensures that at least one full dosing cycle as timed by the control unit will be completed before the filtrate drops below the level of the Vault Drip Enable Off Float 24a. Also, the Drip Dose Enable Float 24b is located at a higher level than the High Level-Alarm Float 22d to ensure that the alarm is sounded in the event of the sand filter pump 22 failure. This will ensure that no untreated filtrate will be discharged into the dosing field. In this configuration, effluent will overflow in the dosing pump vault 16. When the volume in the recirculating pump tank 12 increases so as to raise the High Level-Alarm Float 22d thereby sounding the alarm and turning "off" the dosing pump 24. This ensures that there is no untreated effluent dosed into the dosing field (e.g., absorption drain filed). In use, the filtrate will be pumped to the absorption drain filed via a supply pipe 25.

Figure 4:
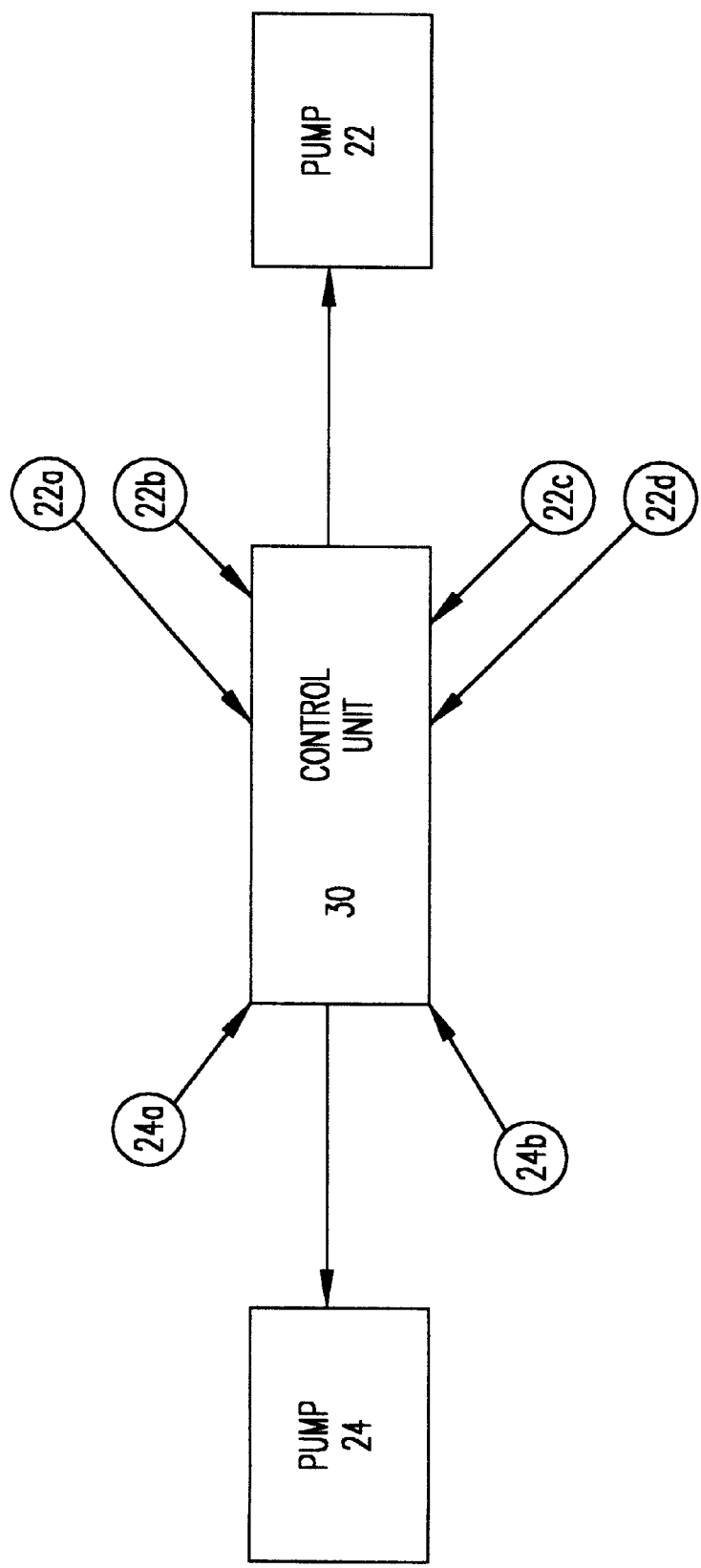
FIG. 4 shows a control unit.

As briefly discussed above and now referring to FIG. 4, the control unit may control dosing cycle intervals of either the sand filter pump 22 or the dosing pump 24. As seen in FIG. 4, the control unit 30 is connected to the sand filter pump 22 and the dosing pump 24 and is preferably controlled by the floats, 22a, 22b, 22c, 22d, 24a and 24b. The control unit allows reprogramming of the time and volume of dose to different individual zones (absorption areas) or to the sand filter. That is, the control unit in conjunction with the floats 22a, 22b and 22 allow for increased or decreased recirculating rates of the effluent and filtrate based on demand and provides equalization and dilution for the accommodation of peak flows. The control unit is also used to control the dosing cycles and flow rates of the sand filter pump 22 and the dosing pump 24. For example, when float 22b is in the "up" position the dose sand filter 22 will dose at a certain frequency based on a certain flow rate, but when float 24b is in the "up" position in combination with float 22b the dose frequency to the dispersal field is provided at the standard flow rate. The time dosing cycles may also be used so that neither of the pumps 22 and 24 will run when there is insufficient effluent in the recirculating pump tank 12 or filtrate in the dosing vault 16, As a feature of the present invention, the sand filter dosing cycle of the sand filter pump 22 or the disposal cycle of the dosing pump 24 may be altered to accommodate observed variance of historic water use as obtained from a flow meter. The system of the present invention may also be "tuned" for sewage flows at the site to insure that the absorption area is dosed at the proper interval.

By way example, when the Vault Drip Enable Off Float 24a is raised, the control unit timer for the sand filter will be set for a period of approximately 180 minutes which will enable the timed dose of the sand filter pump 22. When the effluent rises to a level sufficient to raise the Standard Dispersal Dose Enable Float 22b, the control unit rest timer will set to 90 minutes and the dose is enabled for the effluent to be discharged from the vault. This time period will coincide with a known capacity of the sand filter pump 22 and the dosing pump 24 so that there will be sufficient time for the sand filter pump 22 to dose the sand filter 18 and the dosing pump 24 to dose the absorption drain field 21. The set time further ensures that neither the sand filter pump 22 nor the dosing pump 24 will run without any effluent or filtrate. The dosing pump 24 will continue to run for the length of time as adjusted by the control unit (e.g., timer) and then shut off; however, if the Standard Dispersal Dose Enable Float 22b is still in the raised position, the timer will be reset and the sand filter and drip dosing process will repeat itself.

In the preferred embodiments, the control unit sets the following dosing cycles for a treatment and dispersal system:

1. Standard Drip Field Rest time between doses is set at approximately 180 minutes, 4 doses per day per zone (two zone).

2. Peak Drip Field Rest time between doses is set at approximately 108 minutes, 6.6 doses per day per zone (two zone).

3a. No use, Sand filter rest time 180 minutes.

3b. Standard Sand Filter Rest time between doses is set at approximately 90minutes, 16 doses per day (one zone).

3. Peak Sand Filter Rest time between doses is set at approximately 54 minutes, 26.7 doses per day (one zone).

It is well understood that other dispersal rates and variables may be adjusted depending on the zones, dosage field absorption rates and other variables, and that the above examples are provided for illustrative purposes only.

EXAMPLE OF USE

In use, the wastewater from a building will flow into the septic tank 10, were t e solids are deposited on the bottom thereof and scum floats to the top. The septic effluent then flows into the recirculating pump tank 12. When the effluent level raises both the Sand Filter Off Float 22a and the Standard Dispersal Dose Enable Float 22b, the sand filter pump 22 is enabled and turned "on" and runs at a standard dose rate. The effluent is then dosed to the sand filter 18 for filtering contaminants from the effluent.

The filtrate then flows into the dosing vault 16. When the filtrate raises both the Vault Drip Enable Off Float 24a and the Vault Drip Dose Enable Float 24b from the "off" position, the dosing pump 24 will be enabled and turned "on" so that the filtrate can be dosed into the absorption drain field 21. When the effluent level reaches the level of the Sand Filter-Drip Peak Dose Enable Float 22c, both the dosing pump 24 and the sand filter pump will proceed into a high volume pumping cycle (e.g., higher dosing frequency) which ensures that the effluent flowing into the recirculating pump tank 12 and the filtrate flowing into the dose vault 16 will be adequately treated and discharged into the sand filter 18 and the absorption drain filed 21, respectively.

While the invention has been described in term is of a single preferred embodiment, those skilled in the art will recognize that the invention can be practiced with modification within the spirit and scope of the appended claims.

Having thus described our invention, what we claim as new and desire to secure by Letters Patent is as follows:

1. A filtration and subsurface distribution system comprising:
   a recirculating pump tank for receiving the effluent from a septic tank, said recirculating pump tank having a top and a bottom;
   a sand filter pump located within the recirculating pump tank, the sand filter pump dosing a sand filter with the effluent;

a dosing vault for receiving filtrate from the sand filter, the dosing vault being located in the recirculating pump tank remote from the sand filter pump and having a lower end adjacent the bottom of said recirculating pump tank and an open end spaced from the top of said recirculating pump tank, said dosing vault isolating the filtrate from the effluent in the recirculating pump tank;

a dosing pump for dosing an absorption drain field with the filtrate in the dosing vault, the dosing pump being located within the dosing vault and also isolated from the effluent; and a control unit adapted to control the sand pump and the dosing pump in tandem to prevent effluent in said recirculating pump tank from mixing with filtrate in said dosing vault by preventing the level of either effluent or filtrate from rising above said dosing vault upper end.

2. The filtration and subsurface distribution system of claim 1, further comprising a first float in the recirculating pump tank for enabling the sand filter pump to pump the effluent when a level of the effluent reaches a first height above the sand filter pump.

3. The filtration and subsurface distribution system of claim 2, further comprising an alarm float, the alarm float being located within the recirculating pump tank and at a position above the first float, the alarm float sounding an alarm when an effluent flow rate of the effluent exceeds a flow rate capacity of the sand filter pump.

4. The filtration and subsurface distribution system of claim 2, further comprising an alarm float, the alarm float being located within the recirculating pump tank and at a position above the first float, the alarm float sounding an alarm when there is a failure of the sand filter pump or the dosing pump.

5. The filtration and subsurface distribution system of claim 2, further comprising a high capacity float for increasing a dosing frequency of the sand filter pump and the dosing pump when a level of the effluent reaches a predetermined height within the recirculating pump tank.

6. The filtration and subsurface distribution system of claim 1, further comprising:

a first float for enabling the sand filter pump when a level of the effluent reaches a first height above the sand filter pump;

a second float positioned above the first float for increasing a rate of dosing of the sand filter pump and enabling the dosing pump; and a third float positioned above the second float for increasing the pumping capacity of both the sand filter pump and the dosing pump when there is an excess effluent level or flow rate coming into the recirculating tank pump from the septic tank, wherein the control unit increases or decreases recirculating rates of the effluent and filtrate based on demand determined by the first, second and third floats.

7. The filtration and subsurface distribution system of claim 6, further comprising an enabling float located within the dosing vault for enabling the control unit to begin timing the dosing pump when the filtrate reaches a level above the dosing pump in the dosing vault.

8. The filtration and subsurface distribution system of claim 7, wherein the enabling float disables the dosing pump when the filtrate drops below a predetermined level in the dosing vault.

9. The filtration and subsurface distribution system of claim 7, further comprising a control unit, the control unit controlling the dosing pump and the sand filter pump in combination with the enabling float, the control unit setting a time period for running either the dosing pump or the sand filter pump.

10. The filtration and subsurface distribution system of claim 9, wherein the control unit ensures that the dosing pump and the sand filter pump will not run without filtrate and effluent, respectively.

11. The filtration and subsurface distribution system of claim 7, further comprising an "on"/"off" float within the dosing vault, the "on"/"off" float working in conjunction with second and the third float so that the control unit can control the dosing pump when a level of the filtrate float rises above the "on"/"off" float.

12. The filtration and subsurface distribution system of claim 1, wherein the dosing vault is a splitting device such that effluent and filtrate are not combined.

13. A filtration and subsurface distribution system comprising:

a sand filter pump located within a recirculating pump tank having a first height, the sand filter pump dosing a sand filter with the effluent;

a dosing vault for receiving filtrate from the sand filter, the dosing vault being located within the recirculating pump tank and being an open top at a second height lower than the first height and isolating the filtrate from the effluent in the recirculating pump tank;

a dosing pump for dosing an absorption drain field with the filtrate in the dosing vault, the dosing pump being located within the dosing vault and isolated from the effluent; and a control unit adapted to prevent the effluent or filtrate from rising above the second height and further being associated with the sand filter pump and the dosing pump, the control unit controlling the sand filter pump and the dosing pump in tandem.

14. The filtration and subsurface distribution system of claim 13, comprising a high level alarm float, wherein the high level alarm float is adapted to warn a user when (i) there is an effluent flow rate is higher than the sand filter pump capacity, (ii) there is a failure of the sand filter pump or (iii) a failure of the dosing pump.

15. The filtration and subsurface distribution system of claim 13, wherein the control unit includes a timer in order to provide a time dose basis of a sand filter dosing cycle and an absorption filed dosing cycle whereby the sand filter and absorption area are rested as determined by a resting time determined by the control unit timer.

16. The filtration and subsurface distribution system of claim 13, wherein the control unit ensures that the sand filter pump or the dosing pump will not run when there is insufficient effluent in the recirculating pump tank or filtrate in the dosing vault, respectively.

17. A filtration and subsurface distribution system comprising:

a sand filter pump located within a recirculating pump tank, the sand filter pump dosing a sand filter with the effluent;

a dosing vault for receiving filtrate from the sand filter, the dosing vault isolating the filtrate from the effluent in the recirculating pump tank;

a dosing pump for dosing an absorption drain field with the filtrate in the dosing vault, the dosing pump being located within the dosing vault and isolated from the effluent;

a control unit associated with the sand filter pump and the dosing pump, the control unit controlling the sand filter pump and the dosing pump in tandem;

a high level alarm float, wherein the high level alarm float is adapted to warn a user when (i) there is an effluent flow rate which is higher than the sand filter pump capacity, (ii) there is a failure of the sand filter pump or (iii) a failure of the dosing pump; and an on/off float associated with the dosing pump, the on/off float being at a level higher than the high level alarm float.

* * * * *